United States Patent
Amin et al.

(10) Patent No.: US 7,149,553 B2
(45) Date of Patent: Dec. 12, 2006

(54) METHOD AND SYSTEM FOR PROVIDING POWER TO A COMMUNICATIONS DEVICE

(75) Inventors: Umesh Amin, Redmond, WA (US); Michael Buhrmann, Redmond, WA (US)

(73) Assignee: Cingular Wireless II, LLC, Atlanta, GA (US)

( * ) Notice: Subject to any disclaimer, the term of this patent is extended or adjusted under 35 U.S.C. 154(b) by 932 days.

(21) Appl. No.: 09/828,859

(22) Filed: Apr. 10, 2001

(65) Prior Publication Data

US 2002/0094848 A1   Jul. 18, 2002

Related U.S. Application Data

(63) Continuation-in-part of application No. 08/948,777, filed on Oct. 10, 1997, now Pat. No. 6,256,518.

(51) Int. Cl.
H04B 1/38   (2006.01)
(52) U.S. Cl. ................ 455/572; 455/74.1
(58) Field of Classification Search .......... 455/572, 455/573, 74.1, 462, 465, 127.1, 343.1, 426.1, 455/552.1
See application file for complete search history.

(56) References Cited

U.S. PATENT DOCUMENTS

| | | | | |
|---|---|---|---|---|
| 4,995,072 A | * | 2/1991 | Pedigo | 455/462 |
| 5,173,899 A | | 12/1992 | Ballance | 370/108 |
| 5,508,733 A | | 4/1996 | Kassatly | 348/13 |
| 5,526,403 A | * | 6/1996 | Tam | 455/426.1 |
| 5,587,734 A | | 12/1996 | Lauder et al. | 348/10 |
| 5,594,789 A | | 1/1997 | Seazholtz et al. | 379/207 |
| 5,673,308 A | | 9/1997 | Akhavan | 379/61 |
| 5,729,197 A | * | 3/1998 | Cash | 340/539.3 |
| 5,774,527 A | | 6/1998 | Handelman et al. | 379/93.07 |
| 5,790,177 A | | 8/1998 | Kassatly | 348/13 |
| 5,815,088 A | | 9/1998 | Kurtz | 340/825.72 |
| 5,889,856 A | | 3/1999 | O'Toole, et al. | 379/399 |
| 6,075,496 A | * | 6/2000 | Harriman | 343/821 |

* cited by examiner

*Primary Examiner*—Lee Nguyen
(74) *Attorney, Agent, or Firm*—Kenyon & Kenyon LLP

(57) ABSTRACT

Embodiments of the present invention relate to apparatus and methods to provide power to a communications unit. In one embodiment of the present invention, a system includes a first communications network to engage in communications with the communications unit and a second communications network to provide power to the communications unit.

25 Claims, 6 Drawing Sheets

KNOWN ART

METHOD AND SYSTEM FOR PROVIDING POWER TO A COMMUNICATIONS DEVICE

CROSS REFERENCE TO RELATED APPLICATION

The present application is a continuation in part of U.S. patent application Ser. No. 08/948,777 entitled "SYSTEM FOR PROVIDING POWER TO A WIRELESS SYSTEM," filed on Oct. 10, 1997 now U.S. Pat. No. 6,256,518.

FIELD OF THE INVENTION

Embodiments of the present invention relate to a system for providing power to a communications device in a communications system. More particularly, embodiments of the present invention relate to providing power from a local exchange carrier to a communications device coupled at least one of a plurality of communications networks.

BACKGROUND OF THE INVENTION

The marketplace has seen a proliferation of subscribers to wireless communications services. Subscribers turn to such services for a myriad of reasons. Among those reasons are the services being offered in connection with what are referred to as Personal Communications Service (PCS) communications (e.g., Interim Standard 136 (IS-136) compliant communications), which can include voice and data messaging capabilities. Furthermore, the subscriber to a wireless service typically has a choice of service providers in the area of interest. In contrast to land-line telephone communication networks where typically one local service provider is assigned to a given region, there may be three or four service providers within a given region of interest depending on how many service providers have been allocated in accordance with frequency band allocations. Thus, it is becoming more and more desirable to have those advantages of wireless communication available at the home on a fixed basis in addition to providing wireless communication capabilities of a mobile nature.

A problem arises in connection with providing power to the fixed wireless transceiver. In one configuration the power would be derived from local power sources such as a power (e.g., electric) utility via connection of a converter to a standard 60 Hz, 110 volt electrical outlet. This powering capability, however, is vulnerable to power outages. As a consequence, should the utility suffer some power failure of any prolonged duration, the wireless transceiver, even if it can operate in the short term on battery power, will eventually become inoperative due to an absence of a power supply.

It is known in the prior art as shown in U.S. Pat. No. 5,553,138 to Heald et al., U.S. Pat. No. 5,343,514 to Snyder, U.S. Pat. No. 5,157,711 to Shimanuki, and U.S. Pat. No. 4,232,200 to Hestad et al. to derive power for a communication instrument from a land-line connection to a central office. FIG. 1A shows an illustration of a known method of providing power to a communications device. A subscriber premises 10 can include a land-line telephone 15 connected via land-line 20 to central office 30. The land-line 20 can provide both a communication path and power for land-line telephone 15. For example, the land-line 20 can include a set of communications wires 22 that can carry communications signals (e.g., voice signals) to and from land-line telephone 15. Land-line 20 can also include a set of power wires 21 that can provide power to the land-line telephone 15. One intent of providing the power for the land-line telephone 15 from the central office 30 was to support operations of the land-line telephone 15 such as dialing capabilities, power for the internal circuitry of the phone, power to ring the telephone, etc. The power that has been supplied by the central office, as indicated in the above cited patents, has also come to be used to provide power to other communication elements which interface with the land-line 20 to provide communications over the land-line. For instance, in U.S. Pat. No. 5,553,138, the system provides power to a base station unit that carries communications to the land-line phone from a computer. The other patents show examples of other communication equipment powered by the land-line over which the communication occurs. However, in each of those configurations, the communication device engages in communications over the same land-line that provides power to the communications device.

FIG. 1B shows a known subscriber premises including communications appliances. As illustrated in FIG. 1B, it has become common for a single location, such as a subscriber premises (e.g., a residence, a business premises, etc), to include many other communication appliances in addition to wireless communications devices. These additional communications appliances typically connect to disparate networks which support varied communications and can be powered by different methods and means. For example, a subscriber premises 10 can include one or more communication appliances such as a television 110, a personal computer 120, a telephone 130, a telephone handset 75, etc. Each of these communication devices can interface to an external network. For example, television 110 can be in communication with a satellite broadcast system (e.g., a Direct Broadcast System (DBS)) via a satellite dish 193 and satellite 190. Television 110 can also be in communication with a wireless cable system and/or a broadcast television antenna 113 that receives over-the-air television signals. Television 110 can also be in communication with a cable head end 155 of a cable network 150 via cable 151 coupled to cable television interface unit 152 located at the subscriber premises 10. As used to describe embodiments of the present invention, the term coupled encompasses a direct connection and an indirect connection, and the term communication encompasses a direct communication and an indirect communication. Cable television interface unit 152 is typically powered by a connection of a power converter to a standard 60 Hz, 110 volt electrical outlet. The cable television interface unit 152 can be, for example, a set top box associated with the cable network 150.

Personal computer (PC) 120 can be coupled to a telecommunications network such as the public switched telephone network (PSTN) 160 via a local exchange carrier (LEC) 165 and a telephone interface unit 122. Telephone interface unit 122 typically receives power from at least one of land-line 20 from LEC 165, a connection of a power converter to a standard 60 Hz, 110 volt electrical outlet (e.g., a modem drawing power from a power supply of PC 120 coupled to an electrical outlet), etc. The PC 120 can be connected to a data network such as an Internet protocol (IP) network 170 by an Internet service provider (ISP) 175 coupled to the LEC 165.

Telephone unit 130 can be coupled to the telephone interface unit 122 for a connection to the PSTN 160 and can receive power from land-line 20 to LEC 165. Handset 75 can be part of a fixed wireless system. In a fixed wireless system, a fixed wireless base station 72 (e.g., a receiver/transmitter including a wireless interface unit, etc.) can communication with a handset 75. The fixed wireless base station 72 can communicate via antennae 73 and wireless base station 183 with a wireless switch 180 (e.g., at a wireless switching center). The fixed wireless communications can be via over-the-air transmissions with wireless base station 183 assigned to the area in which the subscriber premises 10 are located. A fixed wireless system can be deemed to be a "fixed" wireless system in that a transceiver (e.g., fixed wireless base station 72) for over-the-air communications are not mobile, but rather stationary and associated with a given subscriber premises. A fixed wireless system, however, can include a portable component such as handset 75 in communication with a fixed wireless base station 72 at a given subscriber premises 10. A known fixed wireless bases station typically draws power from a connection of a power converter to a standard 60 Hz, 110 volt electrical outlet, and either engages in communications over the same land-line that provides power to the communications appliance or is susceptible to power utility power outages.

In view of the foregoing, it can be appreciated that a substantial need exists for methods and apparatus which can advantageously provide a more reliable source of power to a communications device to avoid a disruption of service in the event of power outages.

SUMMARY OF THE INVENTION

Embodiments of the present invention include apparatus and methods to provide power to a communications device. A wireless communications unit can receive power from a local exchange carrier and engage in wireless communications with a wireless switch.

DETAILED DESCRIPTION

Embodiments of the present invention relate to providing power to a communications device (e.g., a wireless transceiver) so that communications can be supported despite a power disruption (e.g. a power outage) of an electrical utility. In one embodiment, communications can be supported notwithstanding a power disruption of an electrical utility by receiving power from a land-line connection to a central office of a local exchange carrier (LEC). In one embodiment, a wireless communications transceiver includes a handset and the transceiver includes a power converter that receives power from the land-line connection and matches it to the power specifications for the wireless communication transceiver (e.g., a cellular transceiver). In another embodiment, the wireless transceiver can be part of a fixed wireless base station in communication with a wireless switch, and a handset can engage in cordless communications with the wireless transceiver. Power conversion circuits can be disposed in the fixed wireless base station with the wireless transceiver. In such an embodiment, a user can have the benefit of a cordless telephone in communications with a fixed wireless transceiver, where the fixed wireless transceiver is powered by power from a local exchange carrier.

Thus, a wireless transceiver can receive power from the local exchange carrier over a land-line connection, and the wireless transceiver does not use the land-line connection for any purpose other than to receive power. As a consequence, the wireless transceiver can remain powered even in the event of an electrical utility power outage that might otherwise disadvantageously effect wireless communications.

Figure 2:
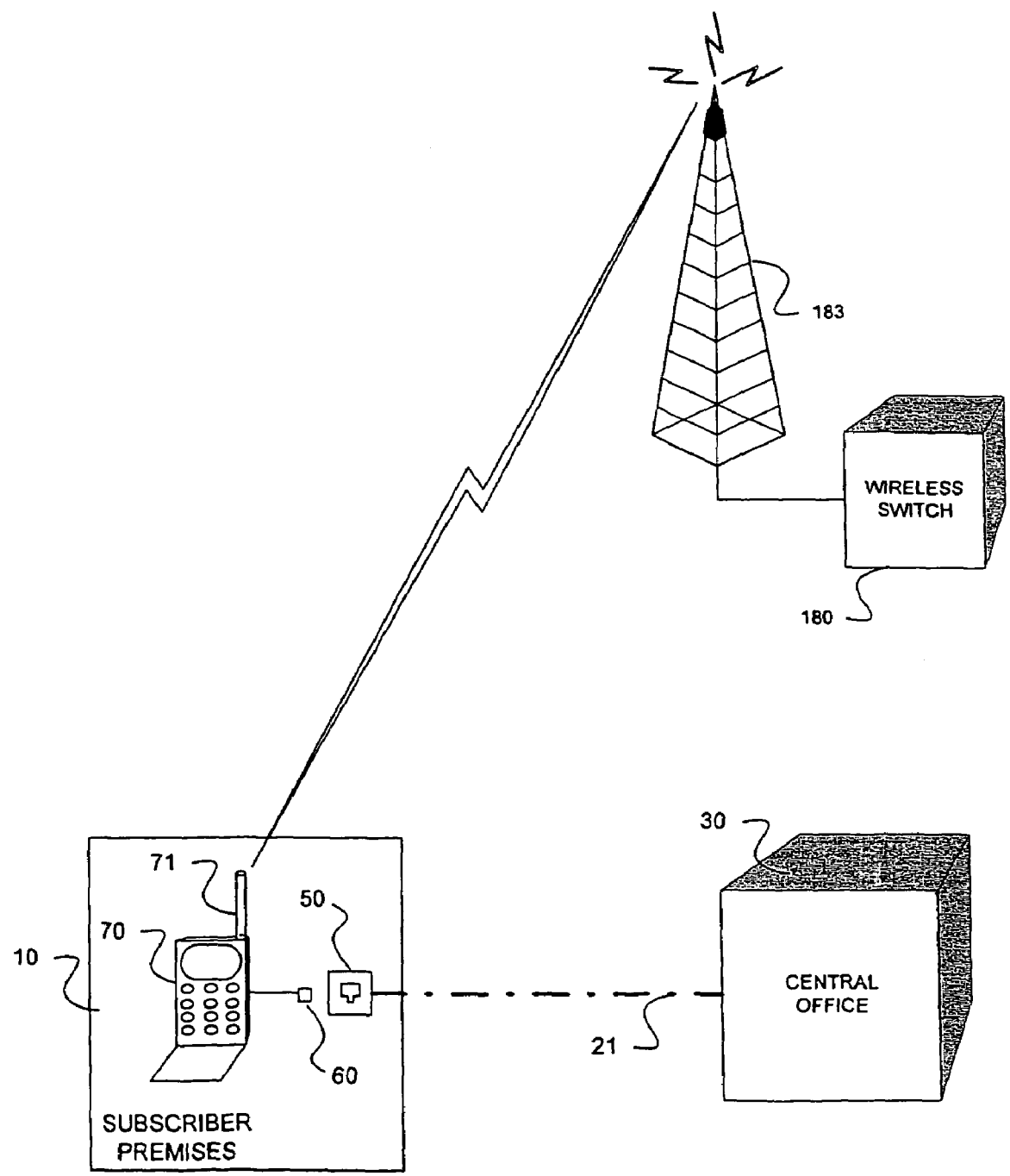
FIG. 2 shows a system in accordance with an embodiment of the present invention.

FIG. 2 shows a system in accordance with an embodiment of the present invention. In one embodiment, a wireless transceiver 70 located at subscriber premises 10 can include an antenna 71 for wireless communication with a wireless switch 180 via base station 183. In one embodiment, wireless communication between the wireless transceiver 70 and the wireless switch 180 is similar to that in the cellular environment (e.g., an Advance Mobile Phone Service (AMPS) analog cellular phone system, an Interim Standard 41 (IS-41) compliant cellular system, an IS-54 dual mode (analog and digital) compliant wireless system, etc.). In another embodiment, wireless communication between the wireless transceiver 70 and the wireless switch 180 includes communications according to digital wireless communications protocols such as an IS-55 Time Division Multiple Access (TDMA) digital wireless communications protocol, an IS-95 Code Division Multiple Access (CDMA) digital wireless communications protocol, Groupe Speciale Mobile (GSM), third generation standard, Third Generation (3G), Wireless Application Protocol (WAP), Global Positioning System, an IS-136 TDMA digital wireless communications protocol including a Digital Control Channel (DCCH), etc. It is noted that the protocols specifically listed herein are for exemplary embodiment only and are not intended to be limiting the invention thereto. An ordinary skilled artisan would appreciate that a variety of similar protocols can be used with the claimed invention and the invention shall not be construed as limited to those of the exemplary embodiments. In one embodiment, wireless switch 180 is part of a mobile switching center.

Figure 1A:
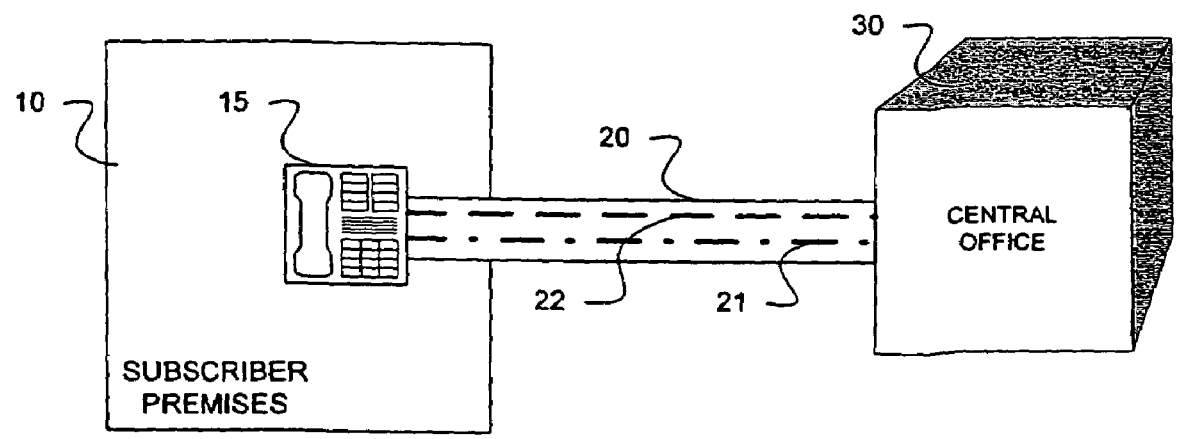
FIG. 1A shows an illustration of a known method of providing power to a communications device.
Figure 1B:
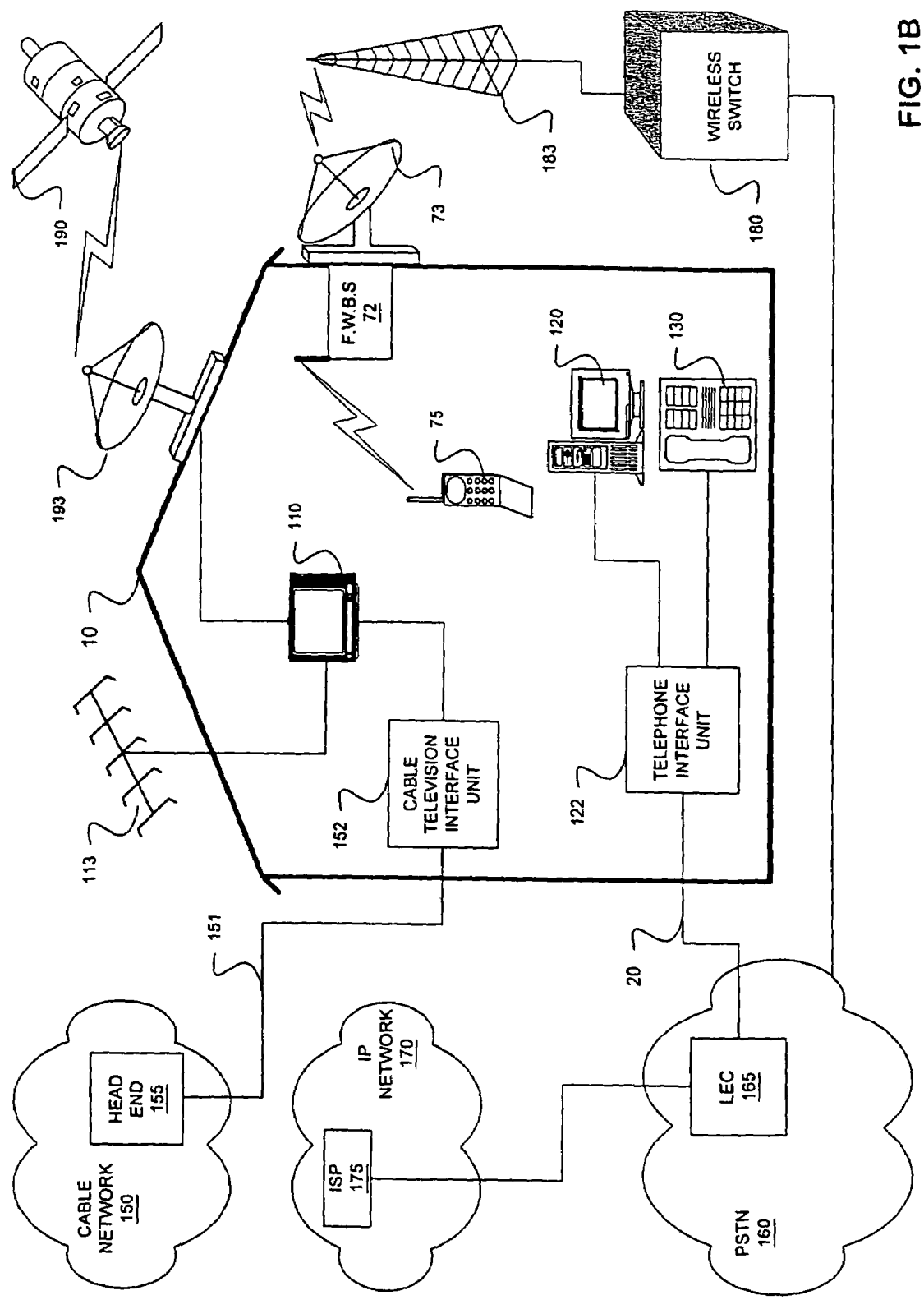
FIG. 1B shows a known subscriber premises including communications appliances.

The wireless transceiver 70 can be coupled via a plug 60 to a wall outlet or receptacle unit 50 which is coupled to power wires 21 of a land-line that connects the subscriber premises 10 to the central office 30 (e.g., via the power wires 21 of land-line 20 of FIG. 1A, etc.). In this configuration, the plug 60, in its connection to the receptacle unit 50, receives power from the power wires 21. That power can be provided to circuitry internal to the wireless transceiver 70. The circuitry, not shown, converts the received power to the appropriate power specification prescribed for operating the wireless transceiver 70. Such circuits are known and can considered analogous to circuitry already existing in cellular phones that derive power, for example, from an automobile power source (e.g., a direct current (DC) power source) or from a typical electrical utility power source, (e.g., a standard 60 Hz, 110 volt alternating current (AC) power source), etc. The details of the circuitry do not form the basis for embodiments of the present invention.

Figure 3:
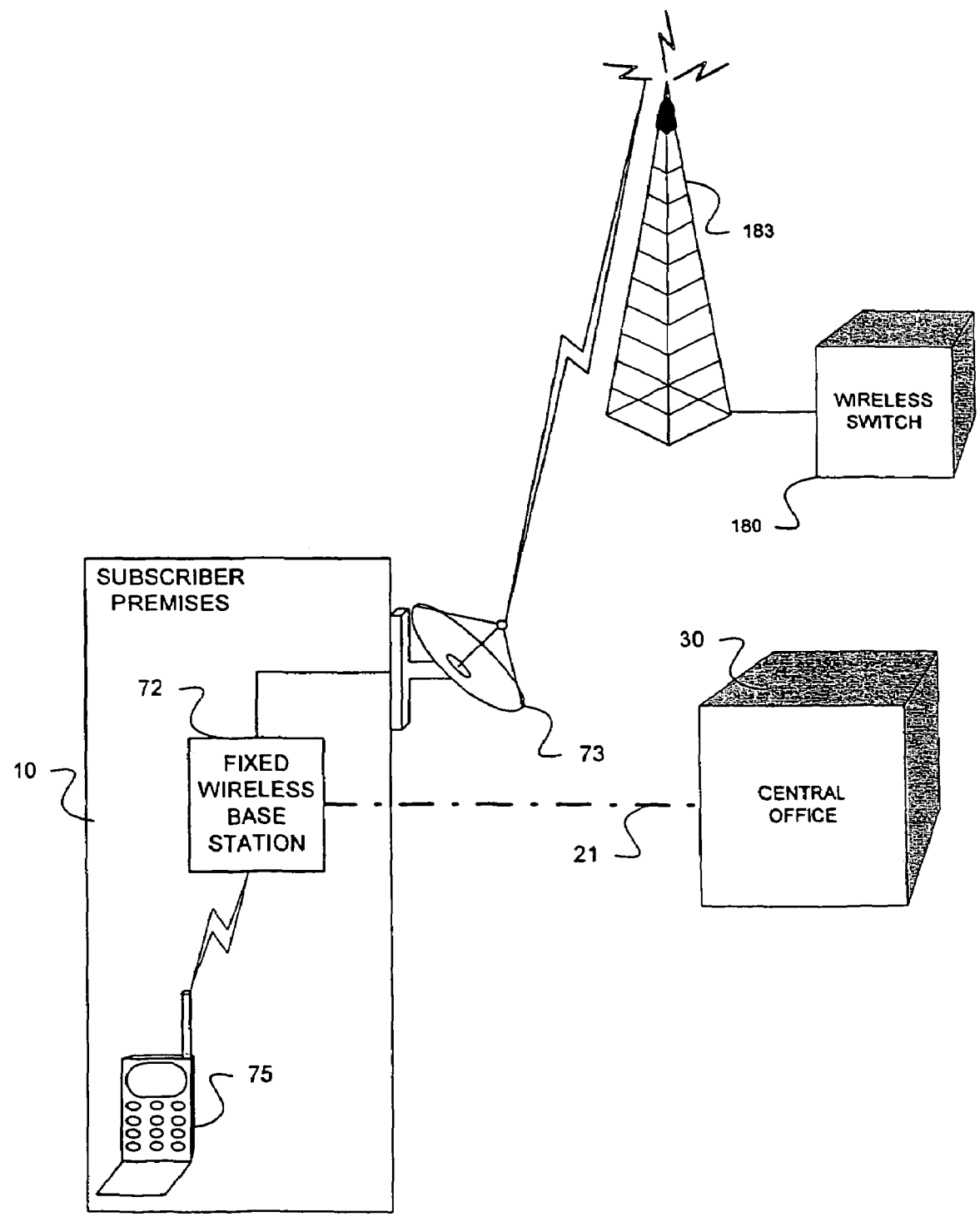
FIG. 3 shows a system in accordance with an embodiment of the present invention.

FIG. 3 shows a system in accordance with an embodiment of the present invention. Subscriber premises 10 can include a fixed wireless base station 72 that receives power from central office 30 via power lines 21 of a land-line connecting subscriber premises 10 and central office 30. Fixed wireless base station 72 can include a wireless transceiver that is powered by power received from the central office 30. A handset 75 can engage in cordless communication with the fixed wireless base station 72.

Cordless communications typically involve a direct communication between a handset and a base over at least one of dedicated set of frequencies for cordless communications such as 46/49 MHz, 900 MHz, 2.4 GHz, etc. Cordless communications between a handset and base obviate the need for the typical coiled cord that can connect a telephone handset to a telephone base. As used to describe embodiments of the present invention, wireless communications (e.g., cellular communications between a cellular transceiver and cellular base station, wireless communications (e.g., AMPS, IS-41, IS-54, IS-55, IS-95, IS-136, etc.) between a wireless transceiver and a wireless base station connected to a wireless switch, etc.) do not include cordless communications.

The fixed wireless base station 72, powered by the power from the central office 30, can engage in wireless communications via antenna 73 with wireless base station 183 and wireless switch 180. In one embodiment, power conversion circuitry can be disposed within fixed wireless base station 72 to convert the power received from central office 30 into a form suitable for powering circuitry of the fixed wireless base station 72.

According to embodiments of the present invention, a wireless communications subscriber can have all of the benefits of wireless communication in a fixed location (e.g., at a subscriber premises, a residence, a place of business, etc.) while reducing a vulnerability to power utility power outages that can otherwise inhibit communications. Certain embodiments of the present advantage can be simply installed in many subscriber premises because a typical subscriber premise has a plurality of phone receptacles (e.g., receptacle 50 of FIG. 2) coupled to a central office. In one embodiment, a land-line can be used to provide land-line communications service to a subscriber premises and also provide power for a wireless communication device (e.g., transceiver) when the wireless communication device is coupled to an outlet or receptacle that is not serving a land-line telephone set or other land-line communication device. Embodiments of the present invention can provide a dependable power connection to a wireless communication device that enhances the subscriber's wireless communication capabilities with an uncomplicated installation.

In accordance with an embodiment of the present invention, a subscriber interface unit (e.g., a digital splitter, etc.) is provided at a subscriber premises and can receive power from a local exchange carrier in the event of a power utility power outage. In accordance with one embodiment of the present invention, a subscriber interface unit such as a digital splitter is coupled to various internal communication networks at a subscriber premises, and each internal communications network includes at least one communications appliance. Examples of such internal communications networks include a telephone network, a local area network (e.g. a personal computer (PC) local area network, etc.), a television transmission network, etc. The digital splitter also can interface to a plurality of external networks, such as a local telephone service via a local exchange carrier, a cable system head end, a wireless communication system, an optical fiber network or other information delivery systems.

In accordance with one embodiment, a digital splitter can oversee control signals from at least one of the external networks to control the coupling operations performed by the splitter. A controller associated with the cable network (e.g., at or associated with a cable head, at or associated with the cable network, etc.), for example, can transmit control signals to the digital splitter so as to selectively couple the internal telephone network to either the cable network or the local exchange carrier. Alternatively, a controller on one of the external networks can remotely enable or disable various ones of the services to which a subscriber subscribes. The digital splitter, in response to such controls, can then either enable or disable the provisioning of the service to the appropriate communication appliance(s) at the subscriber premises. The digital splitter can be provided as a basic digital splitter together with an enhanced digital splitter whereby the enhanced digital splitter includes a backplane that supports plug-in modules defining different system functions.

In one embodiment of a digital splitter, a subscriber at a premises may have a telephonic communication appliance such as a wireless transceiver coupled to a digital splitter. The wireless transceiver can communicate with a cordless handset, a wireline telephonic communications appliance, etc. The subscriber premise can also have a wireline connection to the local exchange carrier so that the carrier can carry telephonic communications to and from the subscriber premises (e.g., to a wireline telephone communication appliance at the subscriber premises). It may also be desirable to use the wireline telephone communication appliance for purposes of conducting telephonic communications over a data network, e.g., conducting voice over Internet Protocol (VoIP) applications. In this circumstance, it would be beneficial if the telephone could be selectively coupled to a data network such as a high-bandwidth cable network. The digital splitter at the subscriber premises can act as a controller to selectively couple the subscriber telephone communication appliance to one of the cable network, the wireless transceiver, the wireline connection to the local exchange carrier. In this manner, the digital splitter can direct communications to and from the subscriber premises via the cable facilities while still maintaining a back-up connection, such as a back-up connection to a local exchange carrier via a standard wireline connection to that carrier, a back-up wireless connection, etc. In the event of a power utility power outage, the digital splitter can draw power from the local exchange carrier and continue to direct communications to and from the subscriber premises. This example is merely representative of one type of communication appliance which might be coupled to a plurality of external networks. Furthermore, the external networks described are only examples. Other external networks can interface with the digital splitter, which can draw power from the local exchange carrier in accordance with embodiments of the present invention.

In accordance one embodiment of the present invention, a digital splitter can provide an external network with the capability of controlling the services that are provisioned to the communication appliances. For example, a controller associated with an external network (e.g., a cable network) can control the coupling of the telephonic communication appliance between the various external networks and also can define the types of functionality to be provisioned to the telephonic communications appliance (e.g., by sending control signals over the cable network to the digital splitter). Alternatively, an external network can control the types of services which may be accessed by any of the communications appliances, (e.g., the television, the PC, or telephone) via any of the external networks. In this circumstance an integrated service provider that is capable of providing a plurality of communications services (e.g., cable video programming, data communication links, telephonic communications capabilities, wireless communications, etc.) to a single subscriber can control the operation of the digital splitter so as to permit access to individual services of the integrated services.

Figure 4:
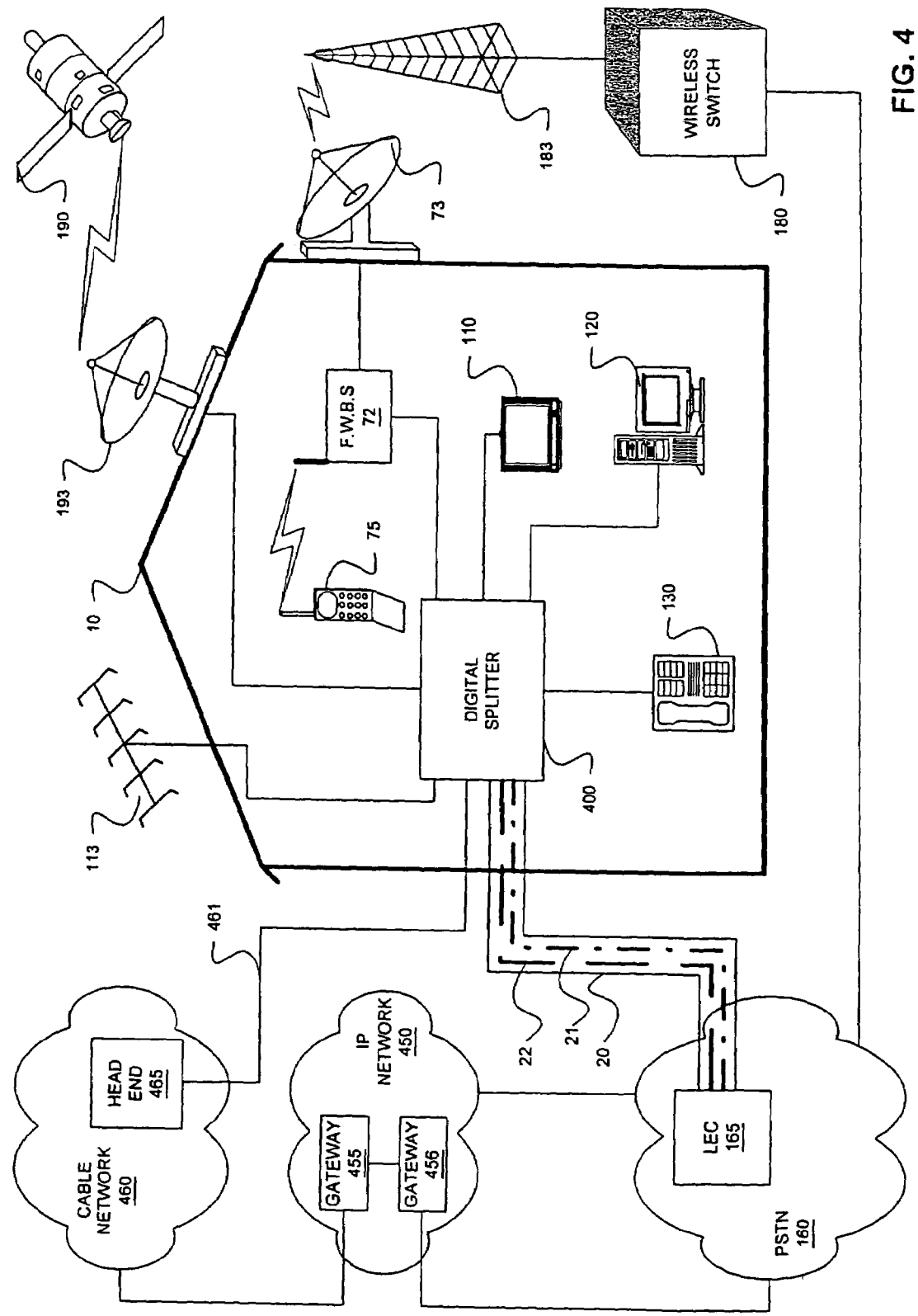
FIG. 4 shows a system in accordance with an embodiment of the present invention.

FIG. 4 shows a system in accordance with an embodiment of the present invention. A subscriber premises can include a plurality of communication appliances such as one or more televisions 110, one or more personal computers 120, one or more telephones 130, a fixed wireless base station 72, a handset 75 that can cordlessly communicate with fixed wireless base station 72, etc. Each of these types of appliances can be coupled to a digital splitter 400. The digital splitter 400 also can be coupled to a plurality of external networks. For example, the digital splitter 400 can be coupled to a local exchange carrier (LEC) 165 of PSTN 160, and the LEC 165 can provide power to the digital splitter 400.

The digital splitter 400 can also be coupled to a cable head end 465 which is capable of providing video programming as well as data and other communication services over high-bandwidth cable 461. The digital splitter 400, in one embodiment, also can be connected to other communication networks, such as an over-the-air television network via antenna 113, a satellite broadcast system via a satellite dish 193 and satellite 190, a wireless communications network via fixed wireless base station 72 and antenna 73 in communication with wireless base station 183 and wireless switch 180. The digital splitter 400 can also be coupled to IP network 450 via cable network 460 and gateway 455. Gateway 455 can adapt communications received from cable network 460 into communications suitable for transmission via IP network 450. The digital splitter 400 can also be coupled to PSTN 160 via cable network 460, gateway 455, and gateway 456. Gateway 456 can adapt communications received via IP network 450 into communications suitable for transmission via PSTN 160. Embodiments of the present invention are not limited to particular internal networks or external networks, nor are they limited to this particular combination of internal or external networks. Finally, it should also be recognized that alternative wireless networks could be supported in substitute for or in addition to the fixed wireless capability referred to in FIG. 4.

In accordance with an embodiment of the present invention the digital splitter operates to selectively couple appliances to a selected external network. For example, the telephonic appliance 130 can have the capability of communicating via either PSTN 165 or via telephonic capabilities provided over cable 461 and cable network 460. The digital splitter 400, in response to control signals from one of the external networks (e.g., from a cable network provider, from a controller at cable head end 465, etc), selects which external network the telephone 130 can be connected or connectable to any given time. Thus, when the subscriber at premises 10 can conduct voice transmissions and communications via the cable network 461 and cable head end 465, the digital splitter 400 can be instructed to establish a default connection of the telephone to the cable network 460 via cable 461 rather than to the PSTN via a wireline connection. Then, should the cable head end 465 detect the occurrence of a condition that would warrant changing the default connection, the cable head end 465 could transmit a control signal to the digital splitter 400 to change the default connection and enable communications between the PSTN 160 and the telephone appliance 130 via the wireline connection. Similarly, the digital splitter 400 can control a connection of a PC 120 to data communications transmission equipment such as along the cable network 460, the IP network 450, or the PSTN 160. In addition, the cable head end 465 can include control capabilities to select which services the subscriber at the premises 10 is entitled to receive. In one embodiment, an operator of cable head end 465 can provide a plurality of services to a subscriber. These services can all be supplied via the cable 461, or alternatively could be provided via a plurality of the external networks, such as providing video programming and VoIP telephony via the cable 461, wireless communications via a wireless network, and IP network communications.

In one embodiment, the digital splitter 400 typically receives power from a power utility, e.g., via a standard, 60 Hz, 110 volt alternating current (AC) power outlet coupled to the power utility. In the event of a power utility power outage, in one embodiment, communications (e.g., voice communications, data communications, etc.) via cable 461 can be interrupted. To maintain communications during a power utility power outage, digital splitter 400 can receive power from LEC 165 via power wires 21 of landline 20. In one embodiment, upon detecting a power utility power outage, the digital splitter 400 can establish a connection for communications via a communications appliance that can engage in communications while powered by power from LEC 165 via power wires 21 of the landline 20.

For example, prior to a power utility power outage, digital splitter 400 can have established, maintained or controlled a connection for communications (e.g. telephonic communications, data communications) via cable 461 and draw power from a power utility. In the event of a power utility power outage, in one embodiment, such communications can not be maintained over cable 461. Accordingly, the digital splitter 400 can draw power from LEC 165 via power wires 21 of landline 20 and establish an alternative communications connection, e.g., a communications connection to LEC 165 via communications wires 22 of landline 20, a communications connection to a wireless network via fixed wireless base station 72 and antennae 73, etc.

Figure 5:
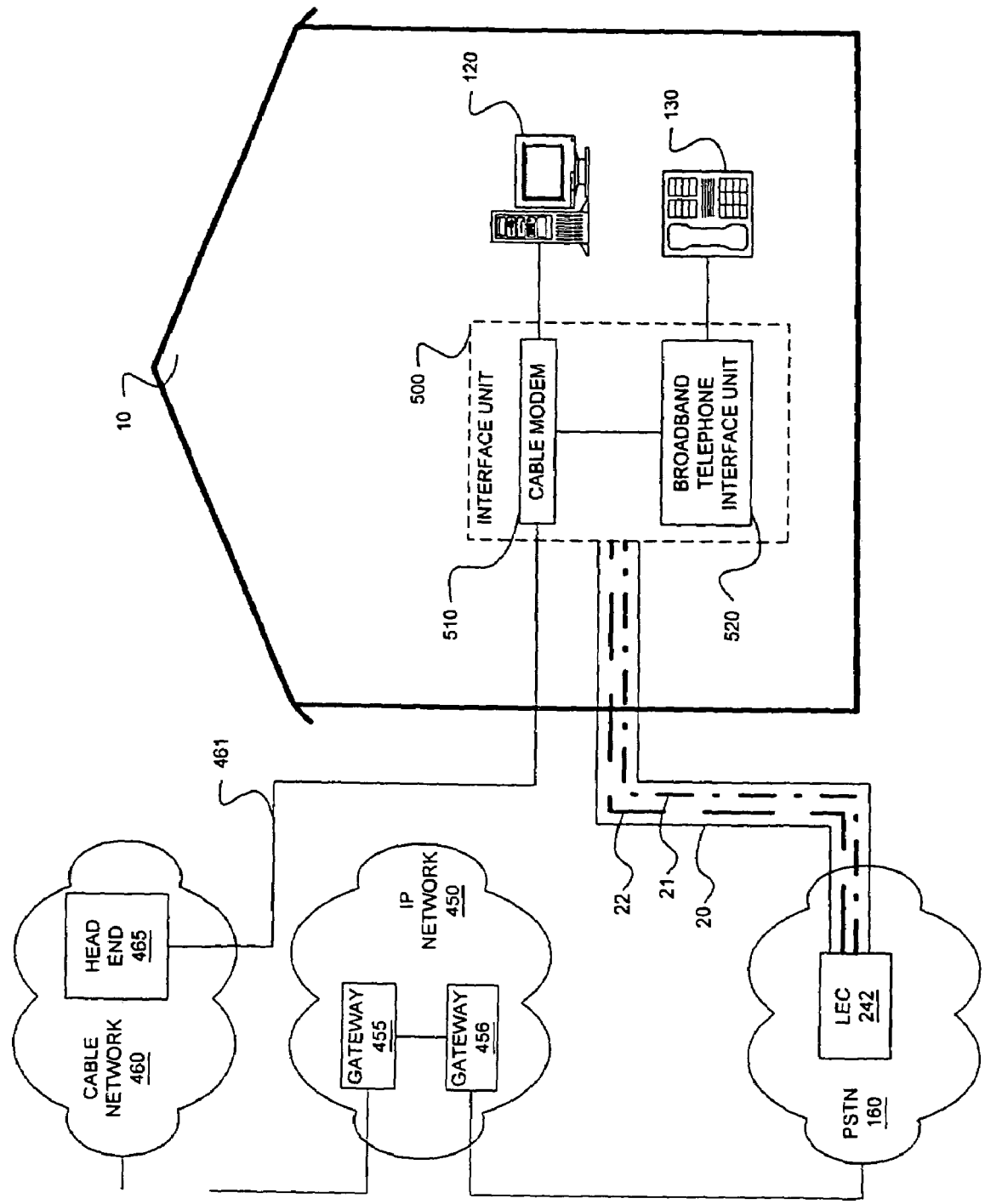
FIG. 5 shows a system in accordance with an embodiment of the present invention.

FIG. 5 shows a system in accordance with an embodiment of the present invention. A subscriber premise 10 includes an interface unit 500 that can interface communications between a PC 120 and cable head end 465, between a telephone 130 and cable head end 465, etc. In one embodiment, interface unit 500 includes a cable modem 510 coupled to PC 120 and a broadband telephone interface unit 520 coupled to telephone 130. PC 120 can communication with IP network 450 and/or PSTN 160 via cable modem 510 and cable network 460. Telephone 130 can communicate with PSTN 160 via IP network 450, cable network 460, cable modem 510, and broadband telephone interface unit 520. In one embodiment, communications between telephone 130 and PSTN 160 are typically communicated over cable 461, and interface unit 500 draws power from a power utility. In the event of a power utility power outage, in one embodiment, such communications can be maintained over cable 461 while the interface unit 500 draws power from LEC 165 via power wires 21. In another embodiment, in the event of a power utility power outage, such communications can not be maintained over cable 461 when the interface unit 500 draws power from LEC 165 via power wires 21, and the interface unit 500 can establish an alternative communications connection, e.g., a communications connection to LEC 165 via communications wires 22 of landline 20, a wireless communication connection to a wireless network via a wireless transceiver coupled to interface unit 500, etc.

Embodiments of methods and apparatus to provide power to a communications device have been described. In the description, for purposes of explanation, numerous specific details are set forth to provide a thorough understanding of the present invention. It will be appreciated, however, by one skilled in the art that the present invention may be practiced without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the present invention.

In the foregoing detailed description, apparatus and methods in accordance with embodiments of the present invention have been described with reference to specific exemplary embodiments. Accordingly, the present specification and figures are to be regarded as illustrative rather than restrictive.

The invention claimed is:

1. A system to provide power to a wireless communications unit, the system comprising:
    a wireless switch to switch wireless calls from and to the wireless communications unit; and
    a landline from a local exchange carrier to provide a normal operating power to the wireless communications unit.

2. The system of claim 1, wherein the wireless communications unit comprises a fixed wireless communications unit.

3. The system of claim 2, wherein the fixed wireless communications unit includes:
    a fixed wireless base station to engage in wireless communications; and
    a handset to engage in cordless communications with the fixed wireless base station.

4. The system of claim 2, wherein the fixed wireless communications unit includes:
    a fixed wireless base station to engage in wireless communications; and
    a handset coupled to the fixed wireless base station.

5. The system of claim 1, wherein the wireless communications unit comprises a wireless communications handset.

6. The system of claim 1, further comprising a base station coupled to the wireless switch, the base station to engage in wireless communications with the wireless communications unit.

7. The system of claim 6, wherein the base station and the wireless communications unit are to engage in wireless communications pursuant to a wireless communications protocol selected from the group consisting of an Advanced Mobile Phone Service wireless communications protocol, an Interim Standard 41 wireless communications protocol, an Interim Standard 54 wireless communications protocol, an Interim Standard 55 Time Division Multiple Access wireless communications protocol, an Interim Standard 95 Code Division Multiple Access wireless communications protocol, GSM, 3G, WAP, GPS and an Interim Standard 136 Time Division Multiple Access wireless communications protocol.

8. A wireless communications systems comprising:
    a wireless communications network, the wireless communications network including a mobile switching center coupled to a base station;
    a wireless communication unit, the wireless communications unit to communicate with the wireless communications network according to a wireless communications protocol; and
    a landline from a central office of a local exchange carrier to provide a normal operating power to said wireless communications unit.

9. The wireless communications system of claim 8, wherein the wireless communications unit comprises a fixed wireless communication unit.

10. The wireless communications system of claim 8, wherein the wireless communications network comprises a cellular communications network.

11. The wireless communications system of claim 8, wherein the wireless communications network is a wireless network selected from the group consisting of an an Advanced Mobile Phone Service wireless network, an Interim Standard 41 wireless network, an Interim Standard 54 wireless network, an Interim Standard 55 Time Division Multiple Access wireless network, an Interim Standard 95 Code Division Multiple Access wireless network, GSM, 3G, WAP, GPS and an Interim Standard 136 Time Division Multiple Access wireless network.

12. A method for providing power to a fixed wireless communications unit, the fixed wireless communications unit including a fixed wireless base station, the method comprising:
    coupling the fixed wireless communication unit to a landline receptacle unit, the landline receptacle unit coupled to a local exchange carrier via a landline;
    supplying a normal operating power to the landline receptacle unit via the landline; and
    receiving wireless communications from the fixed wireless communications units wherein the wireless communications are cellular communications.

13. The method of claim 12, wherein the fixed wireless communications unit is charged by receiving power from the landline.

14. A system for providing power to a cellular communication device comprising:
    a cellular communication device;
    a power supply connected to at least one local exchange carrier providing a normal operating power to said cellular communication device.

15. The system of claim 14, wherein said cellular communication device is a transceiver.

16. The system of claim 14, wherein said wireless communication device is adapted to communicate with a base station according to at least one cellular communications protocol.

17. The system of claim 14, wherein said communication device is capable of transceiving signals to and from at least one cellular base station.

18. The system of claim 14, wherein said communication device further comprises a subscriber interface unit.

19. A power supply for providing power to a cellular communication device comprising:
    an input adapted to receive a normal operating power from a first communication network;
    an output adapted to supply power to the cellular communication device of a second network.

20. The power supply of claim 19, wherein said first and second communications networks adhere to different communications protocol.

21. The power supply of claim 19, wherein said second network is a wireless network comprising a fixed base station and a wireless communication device.

22. The power supply of claim 19, wherein said power supply is coupled to the communication device.

23. The power supply of claim 19, wherein said power supply is integrated with the communication device.

24. The power supply of claim 19, wherein said first communication network is a local exchange carrier.

25. A power supply for providing power to a cellular communication device comprising:
  an input adapted to receive a normal operating power from a local exchange carrier;
  an output adapted to supply power to the cellular communication device of a second network; and
  a converter for converting the electric power from the local exchange carrier to power acceptable to the cellular communication device.

* * * * *